3,586,488
SAMPLING DEVICES
Peter Asquith Trevalion, Helsby, and Ronald Swinhoe,
    Culcheth, England, assignors to United Kingdom
    Atomic Energy Authority, London, England
        Filed May 19, 1967, Ser. No. 639,784
Claims priority, application Great Britain, May 24, 1966,
                     23,190/66
             Int. Cl. B01d 1/00; G01n 1/00
U.S. Cl. 23—273                                    3 Claims

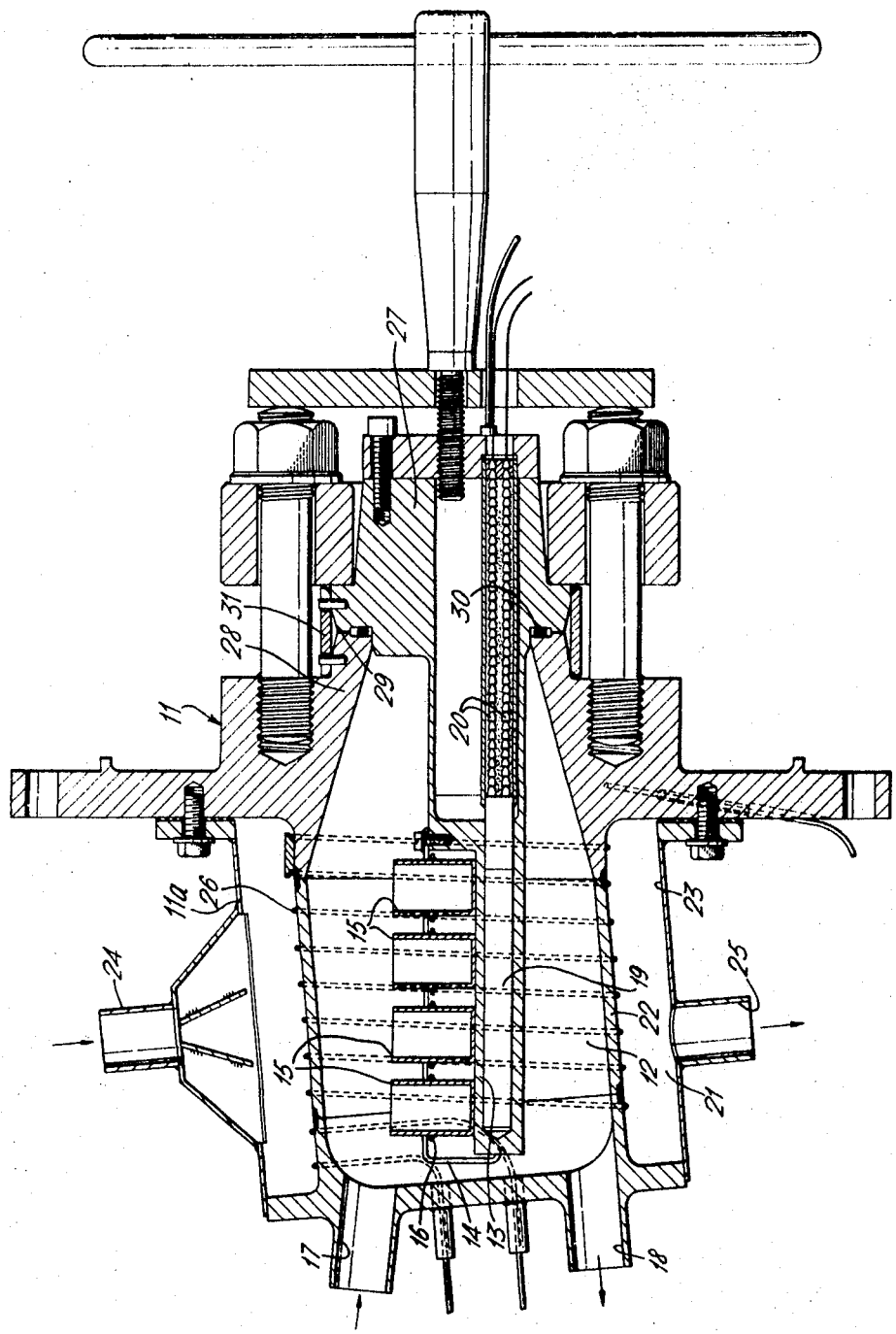

ABSTRACT OF THE DISCLOSURE

A sampling apparatus by which a non-volatile solute may be obtained from a solution of the solute dissolved in a volatile solvent. A sample of solution passed through the apparatus is retained in a demountable crucible having a heater to volatilise solution in the crucible while an adjacent surface is cooled to condense volatile material evolved from the crucible. After heating, the crucible containing the impurities can be removed, and the adjacent surface (which is provided with a separate heater) warmed through to melt material condensed thereon.

---

This invention relates to apparatus for sampling.

It is an object of the present invention to provide an apparatus whereby a sample of non-volatile impurities may be obtained from a solution of the impurities in a liquid metal.

According to the present invention an apparatus for sampling whereby a sample of non-volatile impurities may be obtained from a solution of the impurities in a liquid metal comprises:

a containment vessel with a double walled portion wherein an inner wall defines, at least in part, a chamber within the containment and an outer wall defines, together with the inner wall, a fluid tight space, crucible support means demountably attached to said vessel for supporting a crucible within said chamber, inlet and outlet ducts through said vessel whereby said solution can be directed to flow into and out of said chamber, heater means associated with said support means whereby contents of a crucible supported within said chamber can be heated, inlet and outlet flow means whereby fluid coolant can be directed to flow into and out of said fluid tight space, and means for heating said inner wall of said chamber.

An example of an embodiment of the invention will now be described with reference to the accompanying drawing which is a sectional elevation.

The drawing shows an apparatus for liquid sodium sampling having a containment vessel 11. The vessel 11 has a double walled portion 11a which encloses a chamber 12. A crucible support 13 is demountably positioned inside chamber 12, the support 13 having a wire frame 14 shown retaining crucibles 15 by way of projecting lugs 16 on the crucibles. Liquid sodium can be passed into the chamber 12 by way of inlet duct 17 so that it floods over the crucibles 15 and thereafter passes out of the chamber 12 by way of outlet duct 18. The crucible support 13 is provided with an electrical heater 19 which is energised by way of leads 20. Cooling air can be passed into annular fluid tight space 21 between inner wall 22 and outer wall 23 of chamber 12 by way of inlet 24 and passed out therefrom by way of outlet 25. The inner wall 22 of the chamber 12 is wound with a heating element 26 to allow of uniform heating of the wall 22.

The crucible support 13 is fitted to a demountable cover 27 which is bolted to flanged end 28 of the double wall portion 11a, the flanged end 28 defining an access port to the chamber obturated by cover 27. Between the cover 27 and the flanged end 28 a nickel gasket 29 provides a vacuum tight joint under conditions of thermal cycling (which will arise in repeated usage of the apparatus). Another fluid tight joint is provided between the chamber 12 and the nickel gasket 29 by a metal O ring 30. Both these joints are shrouded by a sleeve 31.

In operation, with all components in place, the sampler is vacuum tested in conventional fashion and a flow of sodium at 400° C. is passed through the chamber 12 by way of inlet duct 17 and outlet duct 18. After the flow of sodium has passed for sufficient time to ensure a representative sample being retained in the crucibles 15 the sodium flow is stopped and surplus sodium allowed to drain away through outlet duct 18. Cooling air is now passed through the annular fluid tight space 21 by way of inlet 24 and outlet 25. The chamber 12 is evacuated and the electrical heater 19 energised to vaporise sodium in the crucibles so as to leave therein only non-volatile impurities originally held in the sodium. The vaporised sodium condenses on the cooled inner wall 22 of the containment vessel 11. On completion of this distillation process, pressure in chamber 12 is equalised to atmospheric pressure with argon, and the demountable cover 27 is removed to give access to the crucibles 15 containing the non-volatile impurities. A fresh set of crucibles can then be inserted and the demountable cover 27 refitted to the flanged end 28. The heating element 26 can then be energised to melt condensed sodium on the inner wall 22 which thereafter drains to the bottom of the chamber 12 without entering the crucibles.

The above operation can then be repeated for further samples.

The apparatus as described guards against the need to handle liquid sodium at any stage by allowing it to flow through a contained system. Contamination of sodium samples by atmospheric air during the distillation is eliminated by distilling in the sampling containment vessel. By suitable modification using conventional techniques, the apparatus could be used for remote sampling (for example for radio-active sodium from a nuclear reactor).

We claim:

1. A sampling apparatus for separating a sample of non-volatile impurities from a solution of the impurities in liquid metal, the apparatus comprising: a containment vessel including a double walled portion comprising an inner wall for defining, at least in part, a chamber within the containment vessel and an outer wall for defining, together with the inner wall, a fluid tight space, crucible support means demountably attached to said vessel for supporting a crucible within said chamber, said chamber having inlet and outlet ducts for liquid metal, a first heater means comprising an electrical resistance heater element for evaporating metal in said crucible, said element being disposed within an enclosure bounded by said crucible support and isolated from the liquid metal flow path through said chamber, flow means for passing fluid coolant through said fluid tight space in heat exchange with said inner wall to condense and solidify evaporated metal on said inner wall of said chamber, and a second heater means for liquifying solidified metal on said inner wall of said chamber.

2. A sampling apparatus according to claim 1 wherein the support means demountably attached to said vessel comprises a fluid tight closure for an access port to said chamber.

3. A sampling apparatus according to claim 1 wherein said second heater means comprises an electrical resistance heater element surrounding said chamber and in thermal contact with said inner wall.

References Cited
UNITED STATES PATENTS

| | | | |
|---|---|---|---|
| 3,002,320 | 10/1961 | Theuerer | 23—273X |
| 3,014,791 | 12/1961 | Benzing et al. | 23—294X |
| 3,229,525 | 1/1966 | Calhoun, Jr., et al. | 159—30X |
| 3,337,304 | 8/1967 | Lorenzini | 23—273 |

NORMAN YUDKOFF, Primary Examiner

R. T. FOSTER, Assistant Examiner

U.S. Cl. X.R.

23—294; 73—425.4